United States Patent [19]

Russon et al.

[11] Patent Number: 4,974,189
[45] Date of Patent: Nov. 27, 1990

[54] MAGNETIC TAPE PACKET ASSEMBLER/DISASSEMBLER SAFEGUARDS EXISTING DATA WITH PRETRIES DURING APPENDS

[75] Inventors: Virgil K. Russon, Greeley; David J. Van Maren, Fort Collins, both of Colo.

[73] Assignee: Hewlett Packard Company, Palo Alto, Calif.

[21] Appl. No.: 232,723

[22] Filed: Aug. 16, 1988

[51] Int. Cl.$^5$ .................................................. G06F 7/22
[52] U.S. Cl. .................................. 364/900; 364/946.8; 364/952.6
[58] Field of Search ............... 364/200, 900; 371/10.2; 360/15, 17

[56] References Cited

U.S. PATENT DOCUMENTS

| | | | |
|---|---|---|---|
| 3,761,903 | 9/1973 | Biro, Jr. et al. | 371/10.2 X |
| 4,434,487 | 2/1984 | Rubinson et al. | 371/10.2 |
| 4,558,446 | 12/1985 | Banba et al. | 371/10.2 |
| 4,631,723 | 12/1986 | Rathbun et al. | 371/10.2 |

*Primary Examiner*—Thomas M. Heckler
*Attorney, Agent, or Firm*—Edward L. Miller

[57] ABSTRACT

A tape packet assembler/disassembler (TPAD) for a tape drive accumulates host-transmitted records, which may or may not be blocked by the host. The interblock gaps that would ordinarily separate the host-transmitted records now separate packets, resulting in a considerable increase in the efficiency of tape utilization. When the user attempts to modify an existing collection of application records the entire packet containing that collection must first be read to place its content into the TPAD, the revision created in the buffer, and then a revised version of the entire packet written back to the tape. A failure in this process can result in the loss or corruption of data in that part of the packet preceding the revision. This loss can come as a surprise and be unacceptable to the user. To prevent such corruption or loss the TPAD does not attempt to overwrite the original version of the packet receiving the modification until it has successfully written a demonstration packet (equal in content to the revised packet) a safe distance down the tape beyond the packet to be overwritten. Only then is an attempt made to perform the actual overwrite on the original packet. If it succeeds the demonstration packet is ignored and may eventually be overwritten by subsequent activity. If the overwrite of the original packet fails for any reason, it is simply erased, creating a large (and harmless) interblock gap ahead of the demonstration packet, which now serves as the permanent replacement version.

2 Claims, 4 Drawing Sheets

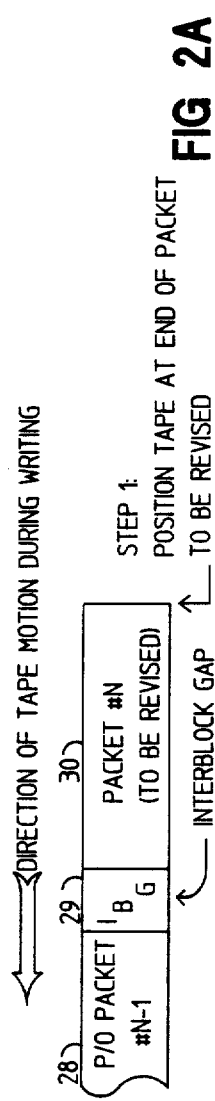
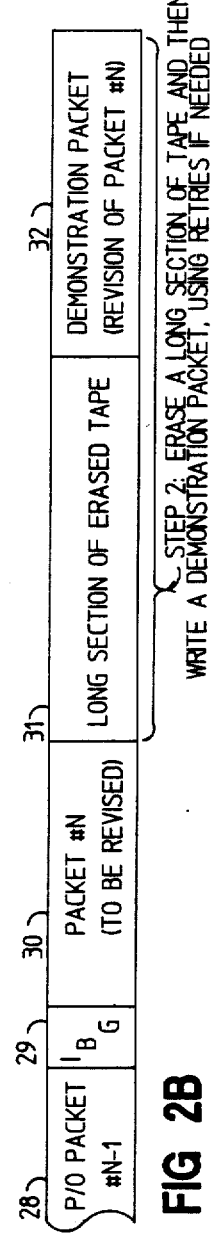
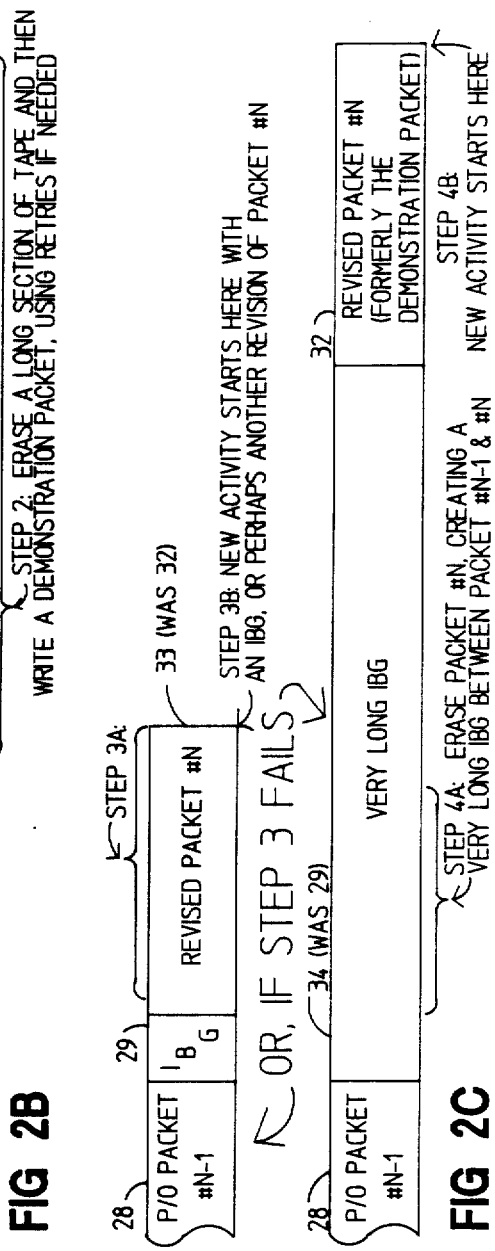
FIG 2A
FIG 2B
FIG 2C

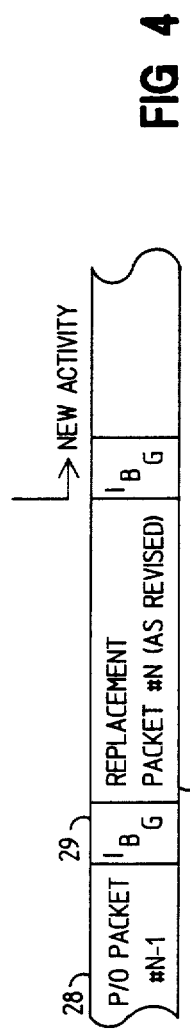
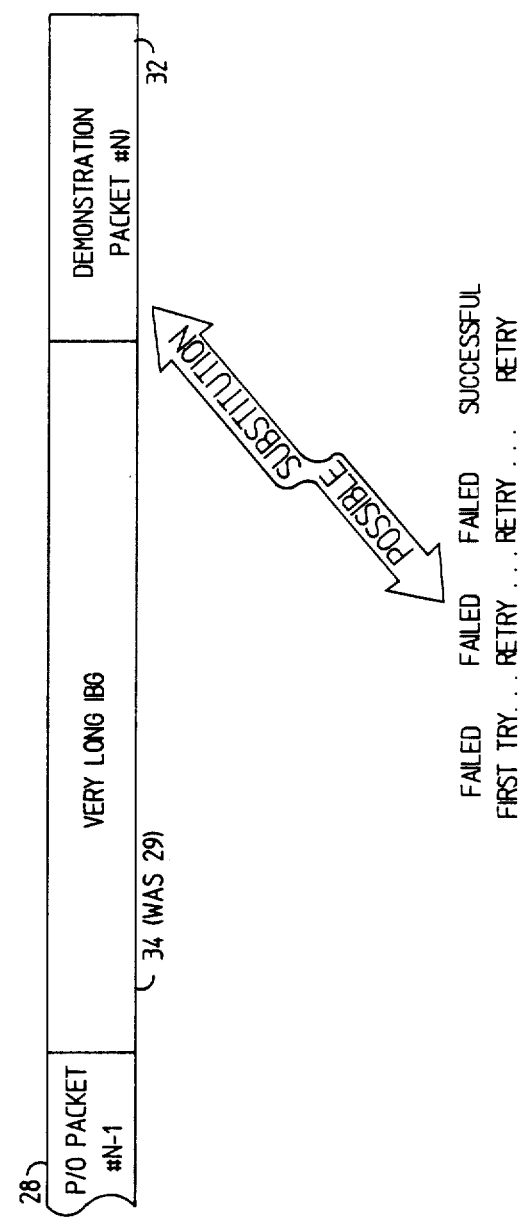
FIG 4
FIG 5

MAGNETIC TAPE PACKET ASSEMBLER/DISASSEMBLER SAFEGUARDS EXISTING DATA WITH PRETRIES DURING APPENDS

REFERENCE TO RELATED APPLICATION

This application is related to the subject matter of application Ser. No. 07/142,180 entitled HIGH CAPACITY TAPE DRIVE TRANSPARENTLY WRITES AND READS LARGE PACKETS OF BLOCKED DATA BETWEEN INTERBLOCK GAPS, filed on 11 Jan. 1988 by Jeff J. Kato, David W. Ruska and David J. Van Maren and assigned to the Hewlett-Packard Company of Palo Alto, Calif. That application (hereinafter referred to as Kato, et al.) is hereby expressly incorporated by reference.

BACKGROUND OF THE INVENTION

When data is written by a computer to a magnetic tape it is a common practice to separate portions of that data with erased sections of tape whose length is of an industry standard amount, such as three tenths of an inch, regardless of the length of tape in between that is required for the data. The empty sections are called gaps; more specifically, inter-record or interblock gaps, depending on the type of data separated by those gaps. It is customary for the operating system to collect consecutive application records into a buffer, from whence they are written by the host computer as entire blocks. These blocks of records are then separated by gaps, which are now called interblock gaps. The accumulation and writing process is called blocking; the corresponding reverse process of reading blocks from the tape, putting them into a buffer and then retrieving the individual records therefrom is called deblocking.

It is clearly seen that the efficiency of tape utilization is determined by the ratio between the amount of tape (between the gaps) used for data and the amount used for the gaps themselves. Since the amount of tape required for each gap is fixed by standardization, high efficiency of utilization requires that the amount of tape with data thereon between the gaps be large in comparison to the size of the gaps. More than simple buffering of blocks into larger blocks is required, however, if such a process is to be invisible to existing operating systems and still write to tape using industry standard tape drives in a way that is in conformance with published standards.

Such transparent "super blocking" is achieved by a tape packet assembler/disassembler (TPAD) located in the command and data path between the host computing environment and the tape drive. Host-transmitted records (whether blocked, compressed, both, or neither) are accumulated in a large buffer in the TPAD. Any characters in the data stream that serve as embedded delimiters of the structural features that have been blocked (e.g., a character whose meaning is end-of-record (EOR)) are left undisturbed, and are treated as ordinary characters. Tape commands, such as Write File Mark, are intercepted and replaced by embedded characters or by other information. Such "other information" can be of various types, and takes the form of tables of linkage information, plus information about the size of those tables. The usual interblock gap that would ordinarily occur on tape between host-transmitted records does not occur, as those records are accumulated into a new unit of tape motion: packets. Interblock gaps will now occur between packets.

Accumulation into the buffer begins at one end thereof and proceeds toward the other end, say, in the direction of increasing addresses. After a selected fractional amount of the buffer has been filled the linkage tables and their size information are appended to their associated data portion in the buffer. The linkage tables and size information is called a trailer. The data portion with its trailer is called a packet. Each packet is large enough to cause the writing of about a foot of tape for a 6250 CPI streaming tape drive. The buffer is large enough to hold, say, eight to twelve packets, depending upon configuration. Packets are written consecutively to the buffer until it is full.

The TPAD can, if needed, split an incoming host-transmitted record into segments stored in consecutive packets. This can happen either because the incoming record is larger than the packets, or because the amount of space remaining in the current packet is insufficient to contain the entire record.

When the buffer is full all the packets therein are written out to tape, with the freed portions of the buffer available for the assembly and storage of new packets, even as the existing ones are still being written. If the host can keep up, then the TPAD may eventually have to hold the host off; otherwise, the host will fall behind, allowing the buffer to either become empty or simply partially filled. After each packet is written to the tape the tape drive will automatically write the usual interblock gap. If, after a gap is written, the buffer contains less than a packet, no further write operations occur, and tape motion ceases; otherwise, the writing of packets continues. Certain commands issued to the tape drive by the host affect the TPAD's packet assembly activities. A rewind command, for example, flushes to the tape any remaining contents of the buffer as a packet, so that the rewind can occur.

The writing of an entire packet of data between interblock gaps means that the efficiency of tape utilization is high. Writing as many consecutive packets as possible with uninterrupted tape motion assists in obtaining efficient use of streaming tape drives, although it will be appreciated that TPAD's are in no way limited to use with just streaming drives. They may be used with equal satisfaction in conjunction with start-stop tape drives, and likewise are not limited to use with any particular recording technique, format or density. In particular, TPAD's may also be used in conjunction with Digital Audio Tape formats (DAT) that employ a moving tape head and a physical record structure of fixed length. As will become apparent, a TPAD can perform its function with only minimal knowledge about the nature of the tape drive, does not need to be physically incorporated into the drive and can, in general, treat the tape drive as a black box whose inner workings are largely mysterious.

To read the tape the process is essentially reversed. The tape drive is commanded to read a packet lying between two consecutive interblock gaps. No special command is needed to do this, as the tape drive knows nothing of a logical structure called packets. The TPAD simply commands the tape drive to read the next (physical) record on the tape; it just so happens that it is a pretty long record. (It's a packet probably containing an entire collection of blocked application records!) If it appears that there is room in the buffer for another packet then the next one is read, and so on, until the buffer is full. As the host sends commands to (attempt to) read physical records from the tape, the TPAD uses the information in the trailer for the current packet (and then the next packet, and so on) to disassemble the packets and send the original host-transmitted records (whether blocked or not) back to the host.

The recovered application records are sent back to the host individually, each in response to a command from the host (intended for the tape drive) to read the next record. Just as the tape drive is unaware of the notion of a packet, so is the activity in the host computer. On the one hand the application program and operating system issue commands at the record level that supposedly cause corresponding tape motion, while on the other the TPAD intercepts these and causes tape motion at the packet level. The fundamental unit of tape motion has now shifted in its level of abstraction, as it relates to the activities the user believes he is causing and controlling. As long as all equipment functions as it should, this shift in the fundamental unit of tape motion is invisible to both the user and the operating system. But when certain types of hardware failures are considered a potential "gottcha" emerges.

Suppose the user has previously written, say, one hundred records to the tape. At a later time he decides that he wants to overwrite those, beginning at record eighty-six. In accordance with accepted and recommended practices, he is prepared to abandon any claim to the last fifteen records on the tape and, makes no attempt to simply replace an intervening record while expecting those after it to remain intact. Accordingly, he rewinds the tape and then commands the tape drive to forward space eighty-five records. (It really doesn't matter how he gets to the start of record eighty-six; any valid combination of commands could be employed.) In itself, this causes no problem; the TPAD knows how to do this. Let's say that the eighty-sixth record is about midway through the nth packet, and that the nth packet contains records seventy-five through ninety-five.

In the situation described the TPAD would move the tape to the start of the nth packet, disassemble that packet, and for the benefit of the host, emulates any appropriate tape drive activity corresponding to the forward spacing over records seventy-five through eighty-five. The user now commands the tape drive to begin to write. Whether the user writes only a new end-of-file mark and then rewinds, or writes only one new record followed by a rewind, or writes one hundred new records causing the refilling of the nth packet and the construction of the next several packets following, the nth packet, in its (new) entirety, must be rewritten to the tape. But suppose the tape drive has failed and does not properly write to the tape?. Then records seventy-five through eighty-five are lost also (destroyed in the defective rewriting of the nth packet), and not just those the user thought he was overwriting. And while it is not possible to protect the user completely from all hardware failures, it can with fairness be argued that: (1) the user gave no permission for anybody to write on the tape at the location of records seventy-five through eighty-five; and (2) the TPAD, if it is to be truly transparent, should conduct its affairs in a way that never compromises the integrity of any data that would be safe if the TPAD and its invisible packets were not in use. After all, it is one thing for record eighty-six and those thereafter to be destroyed; the user did give permission for them to be written upon, and if that fails, the read-after-write feature of the drive can tell him immediately if things have gone haywire. He can at least expect with reasonable certainty that the data up through and including record eighty-five is still good. He knows still what it was that he was going to write, so he still has all his data, albeit somewhat fragmented. It is quite another thing to discover that data he gave no permission to change has been corrupted, and that as the mere user, he has no way of finding out that it has happened or where the corruption might begin.

So, the problem is this: how can the TPAD avoid the corruption of innocent data during the reassembly of an existing packet?

SUMMARY OF THE INVENTION

This potential gottcha is avoided as follows. First, the TPAD detects the fact that an operation is being attempted that requires the writing to tape of a partially reassembled packet; i.e., a packet that has already been written to tape and whose contents are to be changed from some record onward, other than the first record in that packet. Second, upon detecting that situation, the existing packet is not overwritten until it has been demonstrated that the new version has already been successfully written as the next packet safely beyond the one about to be overwritten. Then if the desired overwrite operation is indeed successful, the demonstration packet can itself be overwritten or otherwise treated as expendable and ignored, as future tape operations dictate. However, if the attempted overwrite fails, the old packet is simply erased, leaving the demonstration packet to take the place of the old packet (it is the next packet, after all).

If, on the other hand, the demonstration packet cannot be successfully written after the customary number of retries, the host is so informed and the job is presumably aborted. But at least the tape drive did not corrupt innocent data for which the user did not give permission to alter.

BRIEF DESCRIPTION OF THE DRAWINGS

FIGS. 2A-C are an overview of the pretry method of modifying a packet that has already been written to the tape.

FIG. 4 is a more detailed illustration of one concluding portion of the pretry method, assuming that the revised replacement packet successfully overwrites the original packet.

FIG. 5 is a more detailed illustration of another concluding portion of the pretry method, assuming that the revised replacement packet does not successfully overwrite the original packet, and that the demonstration packet is relied upon instead.

DESCRIPTION OF A PREFERRED EMBODIMENT

Figure 1:
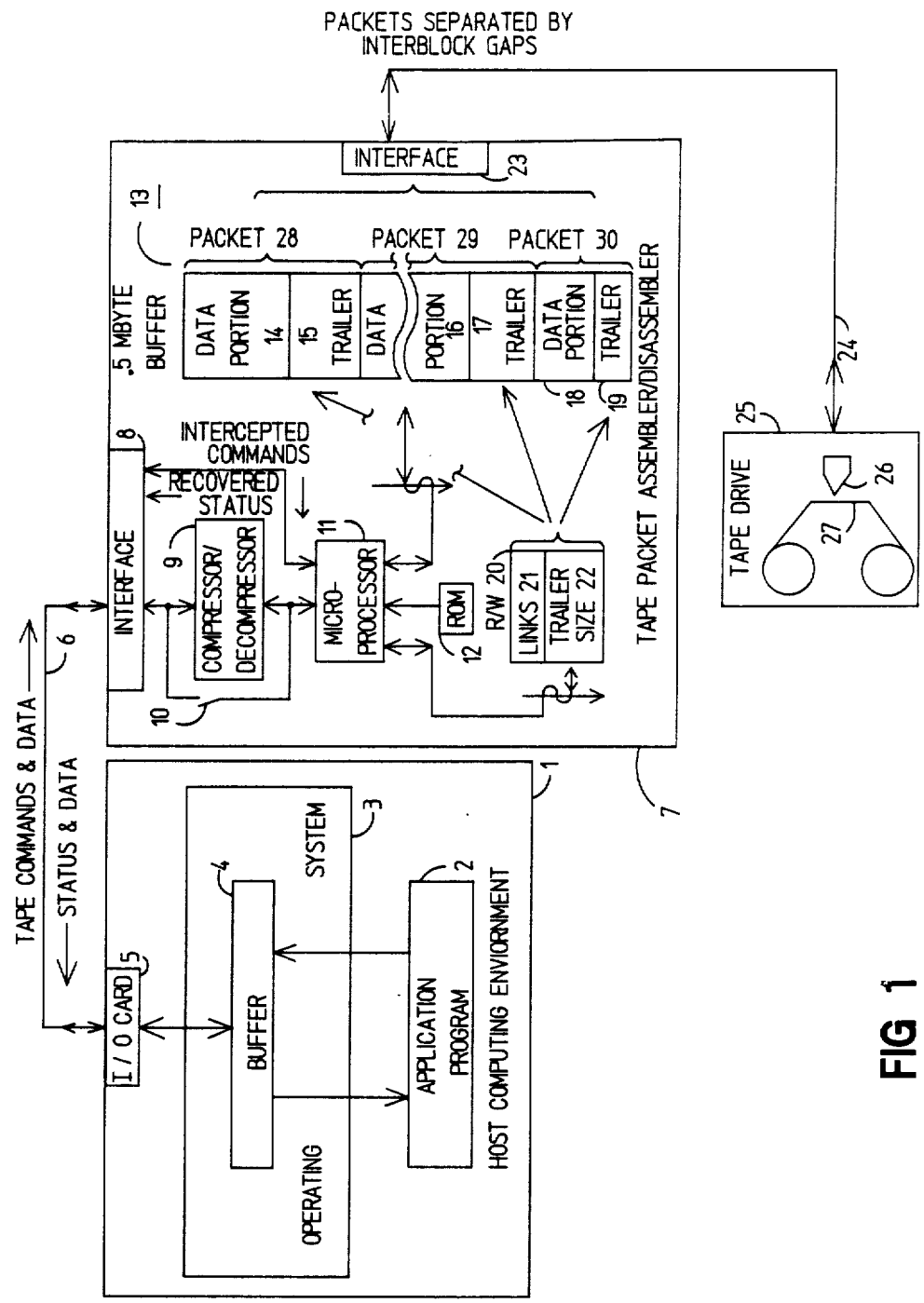
FIG. 1 is a simplified block diagram of a data processing system using a tape packet assembler/disassembler (TPAD) to control a tape drive in accordance with the invention.

Refer now to FIG. 1, which is a simplified block diagram of a host computing environment 1 coupled to a tape packet assembler/disassembler (TPAD) 7 for controlling a tape drive 25 in accordance with the principles of the invention. The host computing environment 1 runs an application program 2 that reads and writes data to and from a tape drive 25. An operating system 3 handles this communication by providing various services, such as making a collection of I/O commands available to the application program 2, management of the interrupt and DMA systems, and by providing a buffer 4 through which the data can be blocked and deblocked. Through the auspices of the operating system 3 data to and from the buffer 4 enters and leaves the host computing environment 1 via an I/O card 5, whose job it is (1) to electrically couple that data to a connecting cable 6, and (2) to perform low level handshaking with whatever device is at the other end of the connecting cable 6. As shown in FIG. 1, tape commands and data are transmitted over the cable 6 from the host computing environment 1 toward the tape drive 25, while data (and usually status information, too) are transmitted in the direction from the tape drive 25 toward the host computing environment 1.

FIG. 1 shows that a tape packet assembler/disassembler (TPAD) 7 resides between the host computing environment 1 and the tape drive 25. The TPAD 7 has two I/O ports. One of them is coupled by an interface 8 to the connecting cable 6 from the host computing environment 1. In this way the TPAD 7 is able to receive the tape commands and data being sent to the tape drive 25, and is further able to send to the host computing environment 1 the data read from the tape and any status information pertaining thereto. The other I/O port includes an interface 23 which receives a connecting cable 24 that is also coupled to the tape drive 25. Over this connecting cable 24 travel (in both directions) packets that were/will be separated on the tape 27 by interblock gaps. Thus, at the port that connects to the host computing environment 1, the TPAD 7 sends and receives data in the form that the operating system intended to transmit through the buffer 4. At the other port that is connected to the tape drive 25, the TPAD 7 send and receives data that has been assembled into packets whose corresponding length of tape is large in comparison to the size of an interblock gap. The principal task of the TPAD 7 is to convert the data arriving at each port into the format of the other port and send it out on that other port, all without either the host computing environment 1 or the tape drive 25 knowing about it.

To continue the overview, a brief summary of the inner workings of the TPAD 7 is as follows. When writing data to the tape drive 25, tape commands and data arrive at the interface 8, whereupon certain commands affecting tape motion (e.g., backspace, rewind) are extracted and sent directly to a microprocessor 11 that controls the operation of the TPAD 7 according to programs that reside in a Read Only Memory (ROM) 12. Various other commands (e.g., write a tape mark) are extracted from the data stream, encoded and integrated into the content of the packet; they are not allowed to reach the tape drive in their native form. When packets are read by the TPAD the tape marks are recovered and the appropriate status information sent to the host, just as if they had come from the tape drive.

(A tape mark is a tape format specific condition written onto the tape that is distinguishable from data and recognizable by the tape drive. The reading of a tape mark is reported by the drive as part of the status information. The meaning of the tape mark is generally left up to the operating system. Each type of nine track tape format generally has only one type of tape mark, and its meaning is usage dependent. In principle, there is no reason why there cannot be several types of tape marks, each with its own individual meaning.)

The data/embedded-command-stream from the interface 8 is then either coupled to or routed around a compressor/decompressor 9. Path 10 with its switch is illustrative of the choice. In the case of data being sent to the tape drive 25 compressor/decompressor 9 would act as a compressor. The original or compressed data stream arrives at the microprocessor 11, whereupon it is sent directly into a selected portion of a buffer 13. In a preferred embodiment buffer 13 is rather large, say, eight bits wide and of about half a million addressable locations. Initially, the data will be loaded into a portion of the buffer 13 such as data portion 14. During this activity certain information about the nature of that data is stored in an area of Read/Write Memory (R/W) 20. This information includes various linkage information 21 and trailer size information 22 about how much information has been stored into R/W 20. When data portion 14 reaches a selected size the storage of data herein briefly ceases while the contents of R/W 20 is appended thereto to form the trailer 15. Together, the data portion 14 and trailer 15 form a packet 28. The process then resumes with the formation of another data portion 16 and the eventual appending of another trailer 17. That forms another packet 29.

Assuming that the host computing environment 1 continues to send data to the tape drive 25, the process of packet assembly described above continues until eventually the buffer 13 is full of packets. At that time the packets are sent via interface 23 and connecting cable 24 to the tape drive 25. As the tape drive 25 writes each packet it automatically follows it by an interblock gap. As packets are written to the tape drive 25 they are "removed" from the buffer 13, and their space is available for the assembly of additional packets. The process continues until there are no more complete packets available for writing to the tape drive 25. At that time the motion of the tape 27 ceases; the cycle just described begins again when the buffer 13 again becomes full. A tape motion command from the host computing environment (e.g., rewind) can force the completion of a packet and the transfer of a partially filled buffer 13, in order to allow the execution of the command.

When reading data from the tape drive 25 the TPAD 7 first ensures that the tape 27 is correctly positioned. Then it reads as many packets into the buffer 13 as there is room for. To reconstruct the data to be sent to the host computing environment 1 the TPAD 7 reads the trailer information for the earliest packet remaining in the buffer 13. This packet can be located because the TPAD 7 keeps track of where in the buffer 13 is the next available location for storing another packet, and continues to keep track of where it put each previously retrieved packet. It then uses the linkage information in the trailer of that earliest packet to disassemble that packet, decompress it if needed, and transmit the originally recorded data back to the host computing environment 1. Any tape marks embedded in the packet are recovered, and the appropriate status information sent to the host. Then the next packet is disassembled and sent to the host. When all the packets in buffer 13 have been disassembled, a new collection of packets is read from the tape drive 25, and the process continues.

A more detailed explanation of the operation of TPAD 7 may be found in the referenced application filed by Kato et al. and incorporated by reference herein.

Refer now to FIG'S 2A–C, wherein is shown an overview of the pretry method of modifying a packet already written to the tape. In particular, FIG. 2A shows the situation in existence at step one of the pretry method. Assume that some number (P) of packets have previously been written to the tape, and that the Nth packet 30 ($1 <= N <= P$) is to be revised and an attempt made to overwrite the Nth packet with its revised version. The figure shows that the Nth packet 30 is preceded by another packet #N−1 (28), and that the two packets #N, #N−1 are separated by an interblock gap (IBG) 29. It will be understood that the Nth packet 30 could even be the very first packet previously written on the tape, and that packet #N−1 28 and the intervening IBG 29 could be absent. Likewise, P may be greater the N, and there may well be other packets (not shown) further along the tape past packet #N 30. As to these other packets beyond packet #N, it is to be understood that the attempt to overwrite packet #N amounts to the kiss of death, regardless of whether or not the revised version of packet #N actually takes more tape. If packet #'s N+1 through P remain of interest, the user must first take steps to save their data someplace else, so that it may later be rewritten to the tape. Anyway, the first step, upon determining that packet #N 30 is to be revised, is to position the tape at the end of that packet 30.

The second step is to erase a suitably long section of tape 31 following packet #N 30, and then write a demonstration packet 32 whose content is the desired revision of original packet #N. See FIG. 2B.

The mechanics of performing the first and second steps will depend somewhat on the type of tape drive in use. Start/stop tape drives and streaming tape drives differ considerably in their internal means for controlling tape motion, so that graphs of tape motion versus time would be very different for the two types of drives. However, the specific tape movements that a particular tape drive might employ in its satisfaction of the commands given to it need not be of special concern to us or to the TPAD. What is important is to note that every drive has an instruction or command set, that these include certain minimum capabilities set out in published industry standards. Since the TPAD uses only tape operations that the tape drive is already designed to implement, it is possible to construct for any such industry standard drive sequences of commands whose issuance by the TPAD will accomplish steps one and two of the pretry method, as well as the remaining steps of that method. In a preferred embodiment the TPAD 7 can function with a plurality of different models of tape drives, and at turn on interrogates the tape drive to learn its model number. This allows the selection of pre-programmed sequences of commands appropriate for the type of drive in use. In short, the TPAD 7 does not concern itself with the dynamics of tape motion; it simply gives the appropriate commmands, which the tape drive then carries out. The time required to accomplish those commands and the actual amount of tape motion that result are a mystery to the TPAD and can vary widely, depending upon the type of drive.

With a DAT drive the operation corresponding to the erasure of the long section of tape is the writing of one or more frames full of "ambles". As far as the user and the TPAD are concerned, this constitutes "erasure".

The third step is to back the tape up to the start of the Nth packet 30, and attempt to overwrite it with the revised version. If this is successful the situation in the upper portion of FIG. 2C obtains, and new transactions with the tape begin beyond the end of the revised packet 33. If the overwrite is not successful (for whatever reason) upon the first try, the attempt to overwrite is aborted, and the entire original Nth packet 30 is erased. Care is taken to ensure that the erase head does indeed get turned off while still within the long section of erased tape 31. The result is a very long IBG 34 (formerly 29) separating packet #N−1 28 and the revised version of packet #N 32 (formerly the demonstration packet); this situation is shown in the lower portion of FIG. 2C. As before, new activity would begin immediately after revised packet #N 32.

How long is the long section of erased tape 31? The answer is, "At least long enough, as determined by at least three factors." One factor that must be taken into account is the potential growth in size of the revised version of the packet to be overwritten. A second factor concerns the ability to control the erase head. Another factor are the specifications concerning the maximum and minimum distances for starting and stopping tape motion for the particular model tape drive in use. In the case of a streaming 6250 CPI drive the latter specifications predominate, and the long section of erased tape 31 is about forty-eight inches long.

Figure 3:
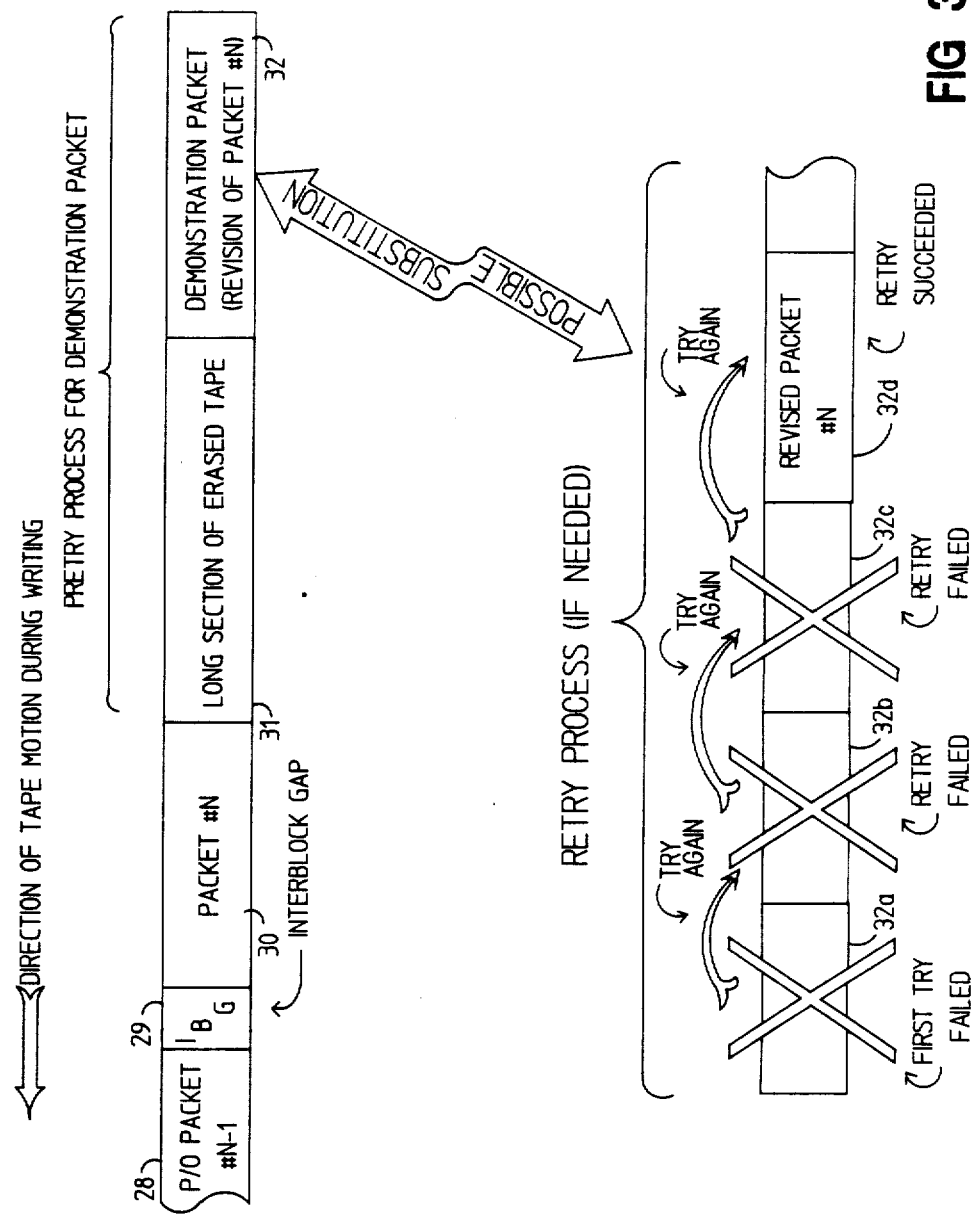
FIG. 3 is a more detailed illustration of an initial portion of the pretry method, showing the writing of a revised demonstration packet without disturbing the existing packet whose content is being revised.

A portion of the method of FIGS. 2A–2C is shown in somewhat greater detail in FIG. 3. What is of particular interest in this figure is how the writing of the demonstration packet 32 may expand to include the conventional retry process. Any suitable retry algorithm may be employed, although a preferred retry technique is one wherein some number of attempted in-place rewrites are performed, which, if unsuccessful, are left as an erased section of tape. Then another retry episode is begun beyond the just erased section. Thus, a succession of retries in writing the demonstration packet 32 adds to the effective length of the long section of erased tape 31. Published industry standards may impose a limit upon the length of interblock gaps. Such a limit would restrict the number of retries permitted. The restricted number of retries permitted for writing the demonstration packet 32 might thus be less than the customary number of retries attempted under other circumstances.

If, after the allowable number of retries the demonstration packet 32 has not been successfully written, an irrecoverable error has occurred. The TPAD will so inform the host, but at least the original packet is still intact.

Encountering EOT (End of Tape) during a retry can be handled as desired. One perfectly satisfactory way is to simply inform the host via the status word that the last record (block) written extended at least part way beyond the EOT marker. It would then be up to the host to quit while it's ahead. Presumably everything is still okay, since if the true physical end of tape had been encountered either the read-after-write feature would have registered a failure to write to tape or there would have been a loss of tension. In either case the retry has ended in an irrecoverable fatal error, (which could always happen anyway, and is not peculiar to the TPAD and its packets) but at least the original Nth packet is still intact.

The larger point to be made in light of the above three paragraphs is that the method of writing a demonstration packet 32 is compatible with, and can benefit from, the notion of retries.

Once the demonstration packet 32 has been successfully written, then an attempt is made to actually overwrite the original packet #N 30 with another copy 33 of the revised version. If this attempt succeeds the situation shown in FIG. 4 obtains. If, on the other hand, it fails, the situation is as shown in FIG. 5. In that case the entire original packet 30 is erased, thus turning the original standard IBG 29 into a very long IBG 34 that now separates packet #N−1 28 and the demonstration packet #N =. Note that demonstration packet 32 may in fact be further down the tape than the end of the long section of erased tape 31 (see FIG. 3) if retries were used in the writing of the demonstration packet 32.

In the preferred method described above only one attempt is allowed in overwriting original packet #N 30 with revised packet #N 33. If that attempt fails for any reason (say, only because of loose contamination on the tape that could be swept away during a retry), original packet #N 30 is simply erased without benefit of any retry process. In an alternate preferred method retries in overwriting the original packet are permitted. In return, the TPAD must understand something of the dynamics of tape motion for the tape drive in use, in order to prevent the retry process from eating up the long section of erased tape 31 and encroaching on the demonstration packet. In other words, the TPAD must accurately keep track of how much tape is being consumed by any repeated retries, and abandon the retry process when a certain margin of safety is reached. This requires extra overhead in the TPAD, but may result in the saving of a certain amount of tape.

To this point we have described what the pretry method is. We now describe how the TPAD can decide when it is necessary to perform the pretry method. We have said that the pretry method is needed when an existing packet on tape is to be modified. This clearly excludes any need to do a pretry when writing a brand new packet as the next packet on the tape. (A pretry here would not afford any advantage over the normal retry process, anyway.) Pretry is reserved for the cases when the user "logically positions the tape" to a "logical location" that is interior to a packet and then initiates a "logical write" operation. (Recall that the user's commands to the tape drive are intercepted, and that the actual physical positioning of the tape will be done in accordance with commands issued by the TPAD to read and write entire packets. Hence, there is almost always a difference between what the user believes the tape position ought to be in terms of his logical records and the actual physical position resulting from the reading and writing of entire packets.)

If it so happens that the logical position, however arrived at, is not also the start of a packet, and a logical (user-originated) write operation for a logical record is initiated, then this packet will be written with a pretry. The need for a pretry is noted, but the pretry itself is not performed until the associated packet is fully assembled and ready to be written as a completed packet. This may take a few or many more write commands to accomplish. A packet can become completed because it eventually becomes large enough, or as the result of some other events, regardless of packet size.

Early completion of a packet can happen when some other activity or event causes the TPAD to write the packet right now, even though it may not yet be big enough to qualify on the basis of packet size. There are at least two ways this can happen. The first is that the user has issued any non-write command (e.g., a status request or an erase command). In order to protect the integrity of the answer returned by the status inquiry, and to guard against insidious gottchas, it was felt that the TPAD must cause completion of any pending logical operations that preceded the request for status. This means that any pending packet must be written before allowing the tape drive to hear the request status command. Another way that packets can be written before their size along would cause it, is for a time out requirement to be met. The TPAD allows the user to specify some time limit for inactivity, beyond which the absence of activity will cause the current packet to be flushed to the tape.

To return now to the discussion of deciding when to do a pretry, the logical position of the tape must be a location interior to the packet, and excludes the very beginning of a packet, for a pretry to be necessary. Why is this? For unless that is the case, there is no gottcha. That is, the user has given permission for records beginning at a certain location to be written, and that location is also the start of a packet, so there are no unsuspected records at risk existing in the packet ahead of that point on the tape.

So the question is: "How does the TPAD determine which packet writing operations require a pretry and which do not?" The answer is essentially an implementation matter concerning housekeeping during the disassembly of packets.

To begin with, we are dealing with a packet that has previously been written to tape. (This must be the case, since during the assembly of packets any non-write user generated instruction to the tape drive causes completion of the current packet and a buffer flush to the tape of all packets in the buffer.) Therefore, the TPAD has (probably) previously read that packet and placed it into the buffer 13. (We say "probably" because the TPAD is smart enough to recognize the case where the packet to be read in from the tape is already, or still is, in the buffer. In such a case the TPAD declines to read the packet from the tape, trusting to its memory and saving some time in the process.) At some point in time, not later than when the user logically positions the tape into the region of that packet, the packet is disassembled. (Unless the packet was already in the buffer, in which case disassembly is unnecessary.) Disassembly means that a packet's trailer information is used in reconstructing the original records in the packet. The reconstruction can be either an actual one into a truthful character by character image, or perhaps just a constructive one into an equivalent collection of related and traversable data structures. (It may be helpful to refer to FIG. 2A-2C of the incorporated application.) The access entries and access table size information in the trailer are used during packet disassembly to build a data structure that is traversed as the logical position of the tape changes. When the pointer into the data structure points at that element corresponding to the first access entry, then the logical position of the tape is also the start of a packet. As the logical tape position moves around within the confines of the packet, different elements are pointed at within the data structure. So, the needed elements for the TPAD's decision are these: (1) is the pointer into the data structure pointing at a portion thereof that represents a packet that has been read from tape and subsequently disassembled (The same data structure exists for the assembly of packets never yet written to tape as exists disassembled packets, so the two cases must be distinguished.); (2) the pointer is not pointing an element that corresponds to the first access entry; and, (3) a write operation is received from the host. To assist in determining condition (1) above, a flag is maintained to indicate that the source of that packet was the tape, rather than the host. This flag is set by the occurrence of a logical (host originated) write following a logical read. A set flag correctly indicates that a packet is being assembled, regardless of whether the packet was already in the buffer or had to be read from the tape. As a practical matter, it boils down to this: Whenever condition (3) arises the existence of conditions (1) and (2) are checked. If those conditions exist, then a pretry is needed.

There are other circumstances under which the use of a pretry can be advantageous when used in conjunction with packets. It is clear that small packets are less efficient in terms of tape utilization than are large packets. The TPAD can keep track of the size of the preceding packet (i.e., the one just ahead of where the next packet to be written would go if one were to be written). Since packets are totally transparent to the user, the TPAD could, on its own, decide that new material ought to be appended to the previous packet, if that previous packet were quite small. This would prevent very small packets from being separated by a relatively large interblock gap, and would contribute to efficient utilization of tape. However, since this involves rewriting stuff already safely on tape that the user has not given permission to place at risk, the pretry method could be used to write the expanded version of the old packet (i.e., to accomplish the append). Such appending to a packet might be disallowed, however, in the case where the packet to be appended to has been followed by an erase command. As a practical matter, such as erasure forces completion of any pending packet, any removes that packet from being a candidate for an append (and hence, also removes the need for any pretry). The TPAD ought not to append new data to a packet when that data has been preceded by an erase command.

Another instance where the pretry method can be valuable occurs in a related circumstance with DAT drives used as computer peripherals. DAT drives write material in fixed-sized chunks called frames. It follows that a TPAD used in conjunction with a DAT drive must assemble packet that are of particular sizes: they must be some integral multiple of a frame. Frames can be pretty big, and it can often happen that a small amount of data ends up in a "caboose" packet, "by itself" so to speak (actually, it is padded to length with nulls, blanks or zeroes, or some such). Absent some intelligence to the contrary, additional data written at a later time would go into a subsequent packet, leaving the preceding embedded "caboose" mostly empty. In this situation, the appropriate thing to do is to append the new data onto the previous packet (i.e., to the caboose), unless the user has specifically requested that the tape following that previous packet be "erased" by issuing an erase command. Clearly, an allowed append operation ought to be done with the pretry method.

We claim:

1. A method of modifying an existing packet of data already written to tape, the method comprising the steps of:

reading the existing packet;

erasing the section of tape immediately following the existing packet for a distance at least long enough to contain the largest packet that can be written;

writing a first instance of a modified version of the existing packet immediately following the erased section;

subsequent to a successful writing step, attempting to overwrite the section of tape containing the existing packet with a second instance of the modified version thereof; and if the attempting step fails, then erasing the existing packet.

2. A method as in claim 1 further comprising the step that if the writing step fails, then performing a selected number of retries to write the first instance of the modified version of the existing packet.

* * * * *